United States Patent
Van Rijswijk et al.

(10) Patent No.: US 10,928,053 B2
(45) Date of Patent: Feb. 23, 2021

(54) INTEGRATED IR RECEIVER IN SIDE-LIT PANELS

(71) Applicant: SIGNIFY HOLDING B.V., Eindhoven (NL)

(72) Inventors: Nicolaas Antonie Van Rijswijk, Oss (NL); Anna Wilhelmina Maria Dergem-De Best, Veldhoven (NL); Rene Theodorus Wegh, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/625,792

(22) PCT Filed: Jun. 21, 2018

(86) PCT No.: PCT/EP2018/066603
§ 371 (c)(1),
(2) Date: Dec. 23, 2019

(87) PCT Pub. No.: WO2019/002093
PCT Pub. Date: Jan. 3, 2019

(65) Prior Publication Data
US 2020/0124263 A1  Apr. 23, 2020

(30) Foreign Application Priority Data
Jun. 29, 2017 (EP) ..................... 17178699

(51) Int. Cl.
*F21V 23/04* (2006.01)
*F21V 8/00* (2006.01)
*F21Y 115/10* (2016.01)

(52) U.S. Cl.
CPC ........ *F21V 23/0471* (2013.01); *G02B 6/0055* (2013.01); *G02B 6/0068* (2013.01); *F21Y 2115/10* (2016.08)

(58) Field of Classification Search
CPC ............. F21V 23/0471; F21Y 2115/10; G02B 6/0011; G02B 6/0051; G02B 6/0055;
(Continued)

(56) References Cited

U.S. PATENT DOCUMENTS 9,030,627 B1  5/2015 Baldwin
2003/0197817 A1  10/2003 Class-Dieter et al.
(Continued)

FOREIGN PATENT DOCUMENTS

KR  200805330 U  11/2008
WO  2014137754 A2  9/2014

*Primary Examiner* — Peggy A Neils
(74) *Attorney, Agent, or Firm* — Daniel J. Piotrowski (57) ABSTRACT

The invention provides a lighting device (100) comprising a plurality of light sources (10), a light guide plate (20), a rim (30), and an IR sensor (40), wherein: (i) the light sources (10) are configured to provide light source light (11), and wherein the light sources (10) are configured in an edge-lighting configuration with the light guide plate (20); (ii) the light guide plate (20) comprises a circumferential edge (22) of which at least part is configured as light incoupling face for the light source light (11), and a first face (21) of which at least part is configured as light outcoupling face; (iii) the rim (30) comprises the plurality of light sources (10) and the IR sensor (40); and (iv) the IR sensor (40) is configured to sense IR radiation (41) via the light guide plate (20).

15 Claims, 2 Drawing Sheets

(58) Field of Classification Search
CPC .. G02B 6/0068; G02B 6/0073; G02B 6/0081;
G02B 6/4298
See application file for complete search history.

(56) References Cited

U.S. PATENT DOCUMENTS

| | | | |
|---|---|---|---|
| 2008/0186737 A1* | 8/2008 | Awai | G02B 6/002 |
| | | | 362/617 |
| 2009/0174300 A1 | 7/2009 | Jousse et al. | |
| 2009/0303409 A1* | 12/2009 | Park | G02F 1/133615 |
| | | | 349/58 |
| 2010/0141153 A1* | 6/2010 | Recker | H05B 45/00 |
| | | | 315/149 |
| 2012/0045171 A1 | 2/2012 | Chen | |
| 2014/0183367 A1 | 7/2014 | Kudo | |
| 2015/0103272 A1* | 4/2015 | Kokusho | G02B 6/0055 |
| | | | 349/12 |
| 2016/0004008 A1 | 1/2016 | Phua | |

* cited by examiner

INTEGRATED IR RECEIVER IN SIDE-LIT PANELS

CROSS-REFERENCE TO PRIOR APPLICATIONS

This application is the U.S. National Phase application under 35 U.S.C. § 371 of International Application No. PCT/EP2018/066603, filed on Jun. 21, 2018, which claims the benefit of European Patent Application No. 17178699.9, filed on Jun. 29, 2017. These applications are hereby incorporated by reference herein.

FIELD OF THE INVENTION

The invention relates to a lighting device comprising a light guide plate and a rim comprising a plurality of light sources and an IR sensor, wherein the light guide plate guides the light source light as well as the IR radiation. The invention further relates to a lighting system comprising such lighting device.

BACKGROUND OF THE INVENTION

The use of IR (infra-red) sensors is known in the art. US20160004008, for instance, describes in an embodiment a switch and socket housing of a guiding light platform. The switch and socket housing may include a switch bore for holding therein the on/off switch, and a socket bore for holding therein the recharge socket. The guiding light platform may be controlled by an infrared remote control. The infrared remote control can be provided with a plurality of buttons. The buttons can be used to switch on, switch off, change color, adjust brightness and control color-changing modes of the LEDs. The color-changing modes may include alternate color-changing for a 7-color LED strip, gradual color-changing for a 7-color LED strip, alternate color-changing for a 3-color LED strip, gradual color-changing for a 3-color LED strip, etc. Electrical components of the guiding light platform may include an infrared receiver. When a user presses a button on the infrared remote control within a certain distance, commands can be transmitted to the infrared receiver on the guiding light platform to control on/off, color change, brightness and color-changing modes of the LEDs. Apart from controlling the LEDs using the infrared remote control, a user can also control the LEDs using the on/off switch. A sloped surface may be formed on the switch and socket housing. The infrared receiver can be mounted on the sloped surface in such a position that the sensing part of the infrared receiver is facing generally upwards towards the upper portion of the frame to facilitate clear reception of infrared signals from the infrared remote control.

SUMMARY OF THE INVENTION

Lighting devices may be provided with an infrared (IR) sensor or receiver, especially for controlling the lighting device. The lighting device may form instance automatically switch on when the infrared sensor senses a presence of a person. In further applications a remote control comprising an infrared transmitter may be used to change a condition of the lighting device, such as switch the lighting device on or off or, e.g., to dim the lighting device or to change a color of the light being emitted by the lighting device.

The current solutions for integrated IR receivers in devices comprise parts that have to be visible for the IR transmitter that is used by the user of the device. In current solutions, the IR sensor is configured in (the) line of sight of an IR transmitter (including an electronic IR transmitter/remote control as well as a human or animal or other object transmitting IR radiation). Parts of IR sensors (such as a lens) may be provided at the exterior of the device or a through hole is made in the device to allow infrared radiation reach the IR sensor mounted in the device. Yet in further solutions the sensor may be visibly mounted in the device. These solutions may be functional but may have a negative impact on the look and feel of the device. Further, such sensors may have impact on the light distribution, as such sensors may e.g. block part of a reflector. Prior art solutions may further comprise additional elements, introducing extra costs for material as well as assembling.

Hence, it is an aspect of the invention to provide an alternative lighting device with integrated IR sensor, which preferably further at least partly obviate(s) one or more of above-described drawbacks. It is also an aspect of the invention to provide a lighting system comprising such lighting device(s).

The present invention may have as object to overcome or ameliorate at least one of the disadvantages of the prior art, or to provide a useful alternative.

Therefore, in a first aspect, the invention provides a lighting device ("device") comprising a plurality of light sources, a light guide plate, a rim, and an IR sensor, wherein (i) the light sources are configured to provide light source light, and wherein the light sources are configured in an edge-lighting configuration with the light guide plate; (ii) the light guide plate comprises (a) a circumferential edge ("edge") of which at least part is configured as light incoupling face for the light source light, and (b) a first face of which at least part is configured as light outcoupling face; (iii) the rim comprises the plurality of light sources and the IR sensor; and (iv) the IR sensor is configured to sense IR radiation via the light guide plate. Especially at least part of the first face is (also) configured as incoupling face for IR radiation, and especially wherein at least part of the circumferential edge is (also) configured as radiation outcoupling face for the IR radiation.

The invention especially provides a solution for invisible integration of an infrared sensor in side-lit panels. The lighting device does not require a lens commonly used for the IR function. The lighting device does not need an IR-eye used in, and visible in or on, most products that are equipped with IR sensor(s) nowadays. The lighting device may be cheaper than prior art solutions by omitting (additional) components normally used for the application of the IR sensor. Further, the invention enables smoother product design. Essentially, the solution is surprisingly found by using the light guide plate for an additional function of guiding the IR signal.

Light guide plates are known to the skilled person and may especially be used in side-lit or edge-lit lighting devices. The light guide plate is especially configured to receive (herein also referred to as to "couple in") a light source light at (at least a part of) an edge (the circumferential edge) and to emit (or "couple out") the light source light (again) at (at least a part of) a face (the first face) of the light guide plate. The edge, especially the light incoupling face, and the first face define a mutually angle. The mutual angle may be in the range of 30-150°, especially in the range of 45-135°, such as 60-120, such as 85-95°. In embodiments, the mutual angle is substantially a right angle.

The term "edge-lighting configuration" such as in the phrase" the light sources are configured in an edge-lighting configuration" especially relates to a configuration wherein the light sources are configured to provide (at least part of) the light source light in a direction towards the (circumferential) edge of the light guide plate, especially to couple (the at least part of) the light source light in the light guide plate. Especially, an axis of the light source light provided by (each of) the light sources intersects the edge of the light guide plate. The edge-lighting configuration especially relates to a configuration of a side-lit or edge-lit lighting device.

Essentially, light source light may be provided to or coupled in the light guide plate at an incoupling face. The light source light may be emitted from or coupled out the light guide plate at an outcoupling face. Hence, especially at least a part of the circumferential edge is configured as light incoupling face (for the light source light), and especially at least a part of the first face is configured as outcoupling face (for the light source light).

The light guide plate may comprise elements that facilitate light outcoupling, such as particulate material embedded in the plate and/or facets and/or a patterned material at the first face, such as ribs, indentations, et cetera. This is known to a person skilled in the art.

As described above, a function of the light guide plate is to guide the light source light generated by the light sources towards the first face, wherein it is coupled out from the light guide plate. Essentially, a further function is to couple IR radiation in at the first face and to couple IR radiation out at the circumferential edge of the light guide plate. Especially, near-infra red ("NIR") radiation (especially comprising a wavelength in the range of 750 nm-1400 nm, especially 850-1050 nm, see also below) may be coupled in at the first face and near-infra red radiation may be coupled out at the circumferential edge of the light guide plate. Hence, especially a path travelled by light source light and a path travelled by (N)IR radiation may almost substantially be the same. Yet, the (N)IR radiation and the light source light may travel in an opposite direction. Essentially, the plurality of light sources and the IR sensor are not in (the) line of sight. The IR sensor does thus not need e.g. an additional mirror element to receive the IR radiation.

The light guide plate is transmissive for light source light and especially also for IR radiation, and especially may reflect or bounce the light source light (and the IR radiation) in the light guide plate (and especially emit the light source light from (at least a part of) the first face and especially emit the IR radiation from at least part of the edge). The light guide plate especially comprises a (visible) light and IR transmissive material or light and IR transparent material. The light guide plate may especially be transmissive and/or transparent for IR radiation in the near-infra red region, see also below. As light transmissive material, especially as light transparent material one or more materials may be selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the light transmissive material may comprise polyethylene terephthalate (PET). Hence, the light transmissive material is especially a polymeric light transmissive material. However, in other embodiments the light transmissive material may comprise an inorganic material. Especially, the inorganic light transmissive material may be selected from the group consisting of glasses, (fused) quartz, transmissive ceramic materials, and silicones. Also hybrid materials, comprising both inorganic and organic parts may be applied. Especially, the light transmissive material comprises one or more of PMMA, transparent PC, or glass. In yet further embodiments, the light transmissive material may comprise one or more of polystyrene (PS), polycarbonate (PC), polyethylenetere pthalate (PET), polymethylmethacrylate (PMMA), and optionally copolymers of two or more of these. The light transmissive material, especially the light transparent material, is especially (also) an IR radiation transmissive, especially IR radiation transparent, material, especially for NIR radiation. Alternatively or additionally, the light transmissive material is (also) IR radiation transmissive, especially IR radiation transparent, for far infrared radiation (especially comprising a wavelength selected in the range of 15 µm-1 mm). In embodiments, the IR radiation comprises near-infrared radiation, especially comprising a wavelength in the range of 850 nm-1050 nm. In yet further embodiments the IR radiation comprises a wavelength in the range of 700 nm-1 mm, such as 850-1 mm.

Especially, the light guide plate comprises an acrylic material, especially (a) PMMA (resin). The light guide plate may further comprise reflective elements, such as particulate material, especially to reflect (or scatter) the light and or the IR radiation inside the light guide plate.

The light guide plate further comprises a second face. Especially, the second face is arranged opposite to the first face. The first face and the second face especially define a height of the light guide plate. In embodiments, the faces are arranged substantial parallel (which includes parallel curved faces). The light guide plate further may comprise a width and a length, especially both defined perpendicular to the height of the light guide plate. Especially, the width and the length are (also) configured mutually perpendicular to each other. The width and the length may especially be larger than the height of the light guide plate. The light guide plate may comprise any arbitrarily shape, such as a circular shape, a triangular shape, a rectangular (including square) shape, an elongated shape, a curved shape, an undulating shape, etc. In embodiments, the light guide plate comprises circular shape. Especially the light guide plate comprises a rectangular shape (including a square shape).

Light source light may (also) be coupled out from the second face. In embodiments, it may be preferred to have light coupled out from two opposite faces.

In other embodiments, light source light is preferably coupled out (only) from the first face. To minimize a loss of light, the light source light may comprise a reflector to reflect light coupled out from the second face (back in the light guide plate). Hence, in an embodiment, the lighting device further comprises a reflector, wherein the reflector is configured to reflect (light source) light that escapes from the light guide plate via a second face back into the light guide plate. The reflector is especially arranged downstream from the second face. The reflector may be arranged parallel to the second face. The lighting device may comprise a reflector arranged at a distance (downstream, see below) from the second face, such as a distance selected from the range of 1 mm-10 cm, especially 1 mm-10 mm. In embodiments the distance is almost substantially 0 mm, especially equal to or larger than 0.7 µm, such as equal to or larger the 1 µm. The use of transparent, non-metal reflectors, if desired, is enabled by this feature as such a distance or gap of at least 1 µm is an optical barrier for visible and near-infrared light and provides a (n additional) mirror function by said optically transmissive material. Thus an improvement in guidance of ambient IR-signal light towards the IR-sensor is obtained. If the distance is less than the wavelength of visible light, the light bridges the distance quite easily and the desired mirror function by optically transmissive material is not obtained. The gap preferably is filled with a material having a relatively index of refraction, e.g. having a refraction index of 1.4 or less, such as air or MgF2. The distance d1 is kept as small as possible to counteract the lighting device to become esthetically unattractive by being too thick/bulky. The reflector may especially not be in contact with the second face. Especially, the reflector is arranged at a non-zero distance from the second face. Additionally a reflector may be arranged at a part of the edge, especially the part not configured as light incoupling face for the light source light (directly) provided by the light sources. For instance, a reflector may be configured to reflect (light source) light that escapes via (a part of) the edge of the light guide plate back into the light guide plate. Hence, especially the optional reflector(s) is (are) not in optical contact with the light guide plate.

Alternatively or additionally, a part of the edge may comprise 3D structures, such as facets to facilitate reflecting the light in the light guide plate.

The term "reflector" may also relate to more than one (different) reflector.

Herein the term "optical contact" such as in the phrase "optical contact between two elements or bodies" relates to a functional contact (between two elements or bodies), wherein a visible radiation and/or an IR radiation may be coupled out the first element and to the second element and vice versa. Moreover, the term optical contact also comprises a physical contact. A distance between two elements being in "optical contact" may especially be equal to or less than about a wavelength of relevance, such as the wavelength of an emission maximum. For visible wavelengths, this may be less than 1 µm, such as less than 0.7 µm, and for blue even smaller. For (N)IR radiation, this minimal distance may be around 1 µm. Hence, herein a minimal distance between two elements not being in optical contact may especially be selected to be non-zero. In embodiments the two elements may be arranged at a distance. Examples of such two elements (that especially are configured not in optical contact with each other) are a reflector and the second face, the IR sensor and the circumferential edge, a reflector and an edge, a diffusor and a face, a light transmissive optical element and a face, etc. (see also below). Especially, a distance between such two elements may comprise a non-zero distance. Especially, the optional diffusor and the optional reflector are not in optical contact with the light guide plate.

In further embodiments the reflector comprises a reflective (diffusive) layer. The layer may (alternatively) comprise a (reflective) metallic material. The layer may be white. Especially, the reflective layer is configured facing the second face of the light guide plate. Also one or more reflectors may be configured at the edge(s) to reflect light back into the light guide plate. The reflectors are especially configured not in optical contact with the light guide plate.

In further embodiments, the second face comprises a rough surface (layer) to redirect the light. In further embodiments, the second face comprises a pattern etched in the light guide plate, especially at the second face. Especially, the second face may comprise a structure to provide a reflection in different directions. Examples of such structures are reflective elements, dots, stripes and patterns. The structure may for instance have been provided by printing at the second face and/or during manufacturing of the light guide plate. Especially the light source light may be redirected (reflected) in different directions (downstream from the second face and/or at the second face), especially into the light guide plate (again). In yet further embodiments, the outcoupling face (also) comprises outcoupling elements to provide a deflected and/or diffuse outcoupled (light source) light. Examples of the outcoupling elements are a pattern and a structure as described above.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In further embodiments, the light guide plate may emit light source light from the first and the second face, and the lighting device especially does not comprise a reflector (configured downstream of the second face). Hence, at least a part of the second face may also be configured as outcoupling face. In a further embodiment the first face and the second face and/or parts of the lighting device downstream from the first face and from the second face are configured alike (see also below).

The plurality of light sources may comprise any arbitrarily kind of light source. The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of light sources, such as 2-2000 solid state light sources.

The light source may be configured to provide color light or to provide white light. Herein, the terms "radiation" or "light" may refer to one or more of UV, visible and IR radiation, especially visible radiation. The terms "visible", "visible light" or "visible emission" refer to light having a wavelength in the range of about 380-780 nm.

The term "IR" such as used in "IR sensor", "IR radiation", "IR transmitter", and the like relates to "infrared" or "infrared" (radiation), especially an electromagnetic radiation having longer wavelength than that of visible light, especially in the range of 700 nm-1 mm, such as in the range of 700 nm-1200 nm, especially in the range of 850 nm-1050 nm. The term "near infrared" and "NIR" especially relate to IR radiation having a wavelength in the range of 750 nm-1400 nm, especially 850 nm-1050 nm. The terms "far infrared" and "FIR" especially relate to IR radiation having a wavelength in the range of 15 µm-1 mm, such as 25 µm-350 µm. Herein, the term IR may especially relate to NIR as well as FIR. The IR sensor is essentially configured to sense IR radiation as described herein. Especially, the term "radiation" relates to IR radiation. Especially, the term "light source light" relates to "light" (or visible radiation).

Especially, the plurality of light sources comprises a solid state light source. In embodiment, the light sources comprise solid state light sources. In a further embodiment, the light sources comprise light emitting diodes (LEDs). Herein the plurality of light sources may (also) relate to more than one (type of) different light source.

The rim may shield the light sources. Especially, the light sources are not visible from a location downstream of the light guide plate. They are especially not in "the line of sight". The rim may allow light source light to be coupled in the light guide plate. In the rim, the light source light is especially directed to the light guide plate. Especially, the rim prevents light source light from escaping in another direction (from the rim). The rim may further comprise an esthetic function. In embodiments, the rim is arranged surrounding the edge of the light guide plate, especially substantially around the entire edge of the light guide plate. The rim especially does not comprise holes, such as holes for entering of IR radiation into the lighting device (known in the art). The rim may contact the first face and especially also the second face of the light guide plate.

The rim and the edge of the light guide plate may define a cavity. Hence, the rim may comprise a cavity. Especially the cavity may comprise (hold) the light sources. The cavity may further comprise the IR sensor. The cavity especially (further) may comprise electronics for the light sources. The cavity may comprise electric wiring. The cavity may (also) comprise a control unit configured to control the light source light.

In further embodiments the lighting device further comprises a control unit, especially functionally coupled to the IR sensor and (at least part of) the plurality of light sources. The control unit is especially configured to control the light source light.

The rim may (further) comprise a wireless transmitter and/or receiver, especially to communicate with a further lighting device and/or with a control system (see also below). A wireless transmitter or receiver may e.g. comprise a Bluetooth transmitter/receiver and/or a Wi-Fi transmitter/receiver and/or a ZigBee transmitter/receiver and/or a (further) IR transmitter/receiver.

Essentially, the rim comprises the plurality of light sources. Essentially, the rim may also comprise the IR sensor. The rim may (also) shield the IR sensor. Especially, the IR sensor is not visible from a location downstream of the light guide plate.

Herein, the term "IR sensor" may also relate to more than one (different) IR sensor. The IR sensor may comprise an active IR sensor (also known as AIR sensor). Alternatively or additionally the IR sensor may comprise a passive (IR) sensor ("PIR" sensor). Herein, the invention is especially described based on a passive IR sensor (detector). The invention, however, also provide solutions comprising an active IR sensor as will be understood by the skilled person. Hence, the IR sensor may also emit IR radiation. Especially, the IR sensor comprises a passive IR sensor. The term "sensor" also refers to a "detector" or a "receiver". These terms may be used interchangeably.

The IR sensor may sense (detect) a presence of IR transmitting object, such as human (or animal) in a space comprising the lighting device. Hence, in embodiments the IR sensor may be used for "presence detection" and the sensor may be named a "presence detector". The term "presence detection" may especially relate to sensing a presence of an object, such as a human body. Such object may especially emit far infrared radiation. A "presence detector" may especially comprise a (passive) IR sensor configured to sense FIR radiation.

Additionally or alternatively, a sensor may sense a pattern in the IR radiation, such as (on/off) pulses in the radiation (especially sent by an IR transmitter). Hence, the IR sensor may sense IR radiation, also referred to as "an IR signal". A sensed IR signal, especially in combination with the control unit may trigger an action. Such action may for instance comprise commissioning the lighting device after installation, for instance assigning the lighting device to a lighting system (see also below). Commissioning the lighting device may comprise providing a signal by the lighting device to a control system (see below), especially informing the control system of the presence of the lighting device. The IR sensor of the lighting device may e.g. sense a (pre)determined IR signal (sent by an IR transmitter). The control unit being in functional relationship with the IR sensor and the light sources may control the light source light based on the sensed IR signal. For instance, the control unit may provide a light source light pattern and/or a specific light source light color and/or intensity configured as a (light) signal. A control system in functional relationship with the lighting device(s) may receive the signal to functionally assign the lighting device to e.g. a lighting system comprising a group of further lighting devices. Especially, such group may (than) be controlled by one presence sensor during use. Alternatively or additionally, the control unit may be functionally coupled to a further (wired or wireless) transmitter (see above) and that transmitter may send a signal to the control system (informing the control system of the presence of the lighting device).

An action triggered by the IR sensor (sensing a signal) in combination with the control unit may especially comprise switching from a first state to a second state or further state, especially controlling a condition of the light source light (e.g. controlling an intensity of the light source light, especially including switching the light source light (the lighting device) on and off, controlling a color of the light source light, etc. (see also below).

The rim may further comprise one or more printed circuit boards, especially functionally coupled to a light source and/or the IR sensor. At least a subset of the plurality of light sources may be connected to a printed circuit board. The IR sensor may be connected to the same printed circuit board or to another printed circuit board. In an embodiment at least a subset of the plurality of light sources is connected to a printed circuit board and the IR sensor is connected to the same printed circuit board. In a further embodiment, at least a subset of the plurality of light sources is connected to a printed circuit board and the IR sensor is connected to another printed circuit board.

The rim may comprise a polymeric material. Alternatively or additionally, the rim may especially comprise aluminum, steel or another type of metal or e.g. metal alloy.

Due to the arrangement of the IR sensor, the additional space required for the sensor is minimal or even negligible. Hence, the rim does not claim more space than necessary for the light sources, and e.g. the control device. This allows a very economic and smooth design of the lighting device. In embodiments, a distance between the light sources, and especially (also) the IR sensor, and the edge of the light guide plate is in the mm-range. In further embodiments the distance is less than 1 mm, such as less than 0.1 mm, or even less. Especially, a distance between the IR sensor and the edge of the light guide plate is a non-zero distance. The light sources may in embodiments not contact the edge of the light guide plate. In further embodiments the light sources may contact the edge of the light guide plate. The IR sensor may in embodiments (also) not contact the edge of the light guide plate.

The light sources may be arranged at one side of the light guide plate, especially at (only) a part of the circumferential edge of the light guide plate. Especially, in such embodiments a reflector may be arranged (see above) at least a part of the remainder of the circumferential edge. Alternatively or additionally, structures, such as facets, may be configured in (at least part of the remainder of) the circumferential edge. Herein the term "remainder of the circumferential edge" relates to a total of the circumferential edge minus the part of the circumferential edge where the light sources are arranged at. The plurality of light sources may also be arranged (at the circumferential edge of the light guide plate) substantially around the entire circumferential edge of the light guide plate. Advantageously, the plurality of light sources may be arranged at (two) opposite parts of the circumferential edge of the light guide plate.

Hence, in an embodiment, a first subset of the plurality of light sources and a second subset of the plurality of light sources are arranged at opposite parts of the circumferential edge of the light guide plate.

The lighting device may further comprise a light transmissive optical element arranged over at least part of the first face, especially over the light outcoupling face. The light transmissive optical element is especially arranged downstream from the first face. The light transmissive optical element may e.g. comprise a diffusor. In embodiments, the light transmissive optical element comprises a color filter. In another embodiment, the light optical element is a micro lens optical plate (MLO). Especially, the light transmissive optical element is arranged at a non-zero distance from the first face.

In further embodiments, the transmissive optical element comprises a lighting screen or baffles (also known as "louvre"). The light transmissive optical element may especially facilitate directing an axis of the light source light at a location downstream from the light outcoupling face, especially the first face.

In a further aspect, the invention provides a lighting system comprising a lighting device described herein and a control system (for controlling the lighting device), and especially configured to be functionally coupled with a user interface device. Especially, the lighting system comprises a plurality of lighting devices. The lighting system comprises at least one lighting device described herein. The lighting system may comprise a plurality of the same lighting devices. The lighting system may also comprise different lighting systems. Hence a plurality of lighting devices may refer to more than one of the same lighting systems and/or more than one of different lighting systems.

The control system may be configured (at least partly) external from a lighting device. Alternatively or additionally, the control system may be configured in (one of) the lighting device(s). In an embodiment the control system comprises the control unit. In a further embodiment the control system comprises the control unit and the IR sensor.

The term "controlling" and similar terms e.g. used in the terms "control system", "control unit" and phrases like "controlling the light source light" and "controlling the lighting device", especially refer at least to determining the behavior or supervising the running of an element. Hence, herein "controlling" and similar terms may e.g. refer to imposing behavior to the element (determining (or triggering) the behavior or supervising the running of an element), etc., such as e.g. measuring, displaying, actuating, opening, shifting, changing (color) temperature, switching on/off, changing the intensity, etc. Beyond that, the term "controlling" and similar terms may additionally include monitoring. Hence, the term "controlling" and similar terms may include imposing behavior on an element and also imposing behavior on an element and monitoring the element. The control system may change the lighting device from a first state to a second state or a further state. The control system may e.g. switch the lighting device off, control the intensity of the light source light of the lighting device, etc. The control system may comprise a plurality, especially a network, of control system units. In embodiments, at least one control system unit comprises a control unit (comprised by a lighting system). In an embodiment, the control system may control a condition of a first lighting system. In a further embodiment, the control unit of said lighting device may control a condition or state of a second and/or further lighting system. Hence the lighting system may comprise a network of lighting devices each controlling a further element, especially wherein one or more of the lighting devices control another lighting device. Especially, the control unit of the lighting device may control a further lighting device. Especially, the control unit(s) of the lighting device(s) is (are) part of the control system.

The lighting system may comprise a master device and a slave device, especially mutually functionally coupled. Especially, the system may comprise elements that function as a master device and/or a slave device. The master device may especially comprise an element that may control (an element of) the slave device. In the lighting system for instance (an IR sensor in) a first lighting device may sense an IR signal. The control unit of the first lighting device may (based on the IR signal sensed) change a condition of the first light source, e.g., controls that the lighting device starts emitting the light source. Especially an IR signal relates to a pattern in the IR radiation, such as pulses in the radiation over time. Additionally the first lighting device may contact (such as by a wired or wireless connection), a second lighting device and control the behavior of the second lighting device. In such embodiment, the first lighting device functions as a master device and the second lighting device functions as a slave device. The network may be dynamic. Hence, the second lighting device may (also) function as a master device and control a further slave device, especially a further lighting device. In an embodiment, e.g. a condition, such as a color, of a first lighting device (functioning as a slave device) may be controlled by a condition, such as a color, of a second lighting device (functioning as a master device), and especially (also) a condition of a further lighting device (functioning as a slave device) may be controlled by the first lighting device and/or the second lighting device (functioning (also) as master device(s)), etc. In embodiments, the control system directly controls the lighting devices. In further embodiments, the lighting system, especially the control system, may comprise furthers sensors (especially functionally coupled to the control system), e.g. a sensor sensing a light signal provided by a lighting device (e.g. during commissioning, see above)

The term "in a first state" indicates that there is at least one setting with essentially fixed conditions. In general, such first state is the state wherein the system is in use. Hence, the term "first state" may also refer to an "on state". Would the system be controllable, then there may be different "on states". In such embodiment, there may be a first state, a second state, and optionally further states. This may e.g. be the case for systems which can be in use with (continuously) variable conditions. Here, the term "condition" may e.g. refer to intensity of the light source light.

Especially, the lighting system comprises a user interface device ("user interface"). Examples of user interface devices include a manually actuated button, a display, a touch screen, a keypad, a voice activated input device, an audio output, an indicator (e.g., lights), a switch, a knob, a modem, and a networking card, among others. Especially, the user interface device may be configured to allow a user to instruct the device or apparatus with which the user interface is functionally coupled. The user interface may especially include a manually actuated button, a touch screen, a keypad, a voice activated input device, a switch, a knob, etc., and/or optionally a modem, and a networking card, etc. The user interface may comprise a graphical user interface. In embodiments, the lighting system further comprises a user interface device, especially functionally coupled to the control system. The term "user interface" may also refer to a remote user interface (device), such as a remote control. A remote control may be a separate dedicate device. However, a remote control may also be a device with an App configured to (at least) control the system or device or apparatus. The user interface device may especially comprise a portable user interface device. Especially, the user interface device comprises a portable device, such as a smart phone (comprising an App). Especially the user interface device comprises a master device function. In further embodiments the control system comprises a user interface device, especially a portable user interface device.

Portable (user interface) devices may include mobile computers (such as mobile internet devices, tablet computers ("tablets"), wearable computers ("wearables", such as calculator watches, smartwatches, head-mounted displays), personal digital assistants, enterprise digital assistants, calculators, handheld game consoles, portable media players, ultra-mobile pcs, digital media players), digital still cameras (DSC), digital video cameras (DVC) or digital camcorders, mobile phones (such as smartphones, feature phones, iPhones) (also indicated as "cell phones"), pagers, personal navigation devices (PND), smart cards, et cetera.

In an embodiment the lighting system, especially the control system (further), comprises an IR transmitter configured to transmit an IR signal to be sensed by the IR sensor of (at least one of) the lighting device(s). At least one control system unit may comprise an IR transmitter. Further, a lighting device may (also) comprise an IR transmitter. Additionally or alternatively, the user interface device may comprise an IR transmitter. Especially, the term "an IR transmitter" may relate to more than one (different) IR transmitter.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, or LCD backlighting. The lighting device may be applied or mounted in a space, such as an open space or a closed space like a room, an office, a green house, et cetera.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
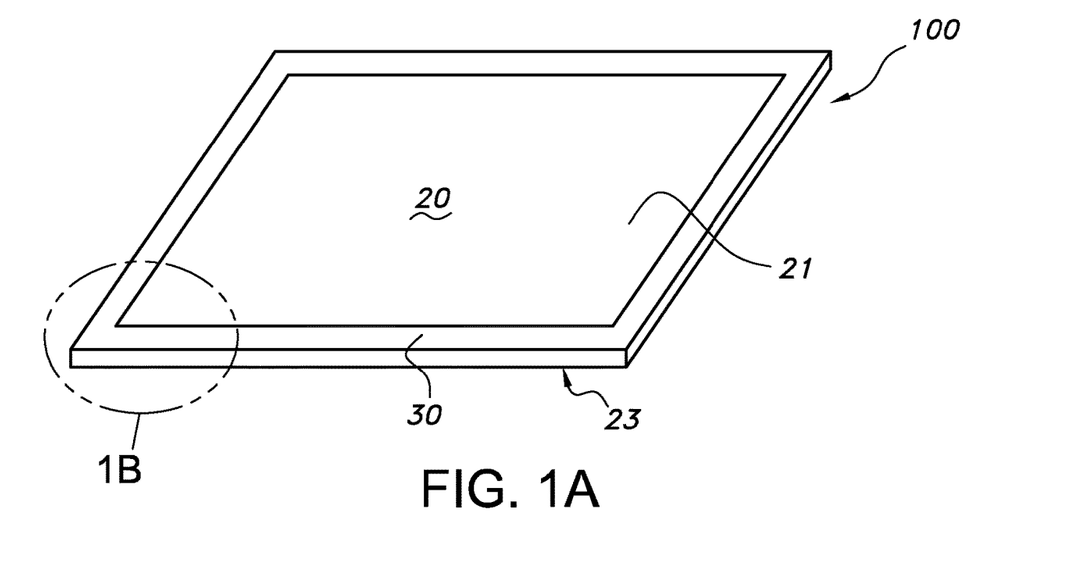
FIGS. 1a-1b schematically depict some aspects of the lighting device.
Figure 1B:
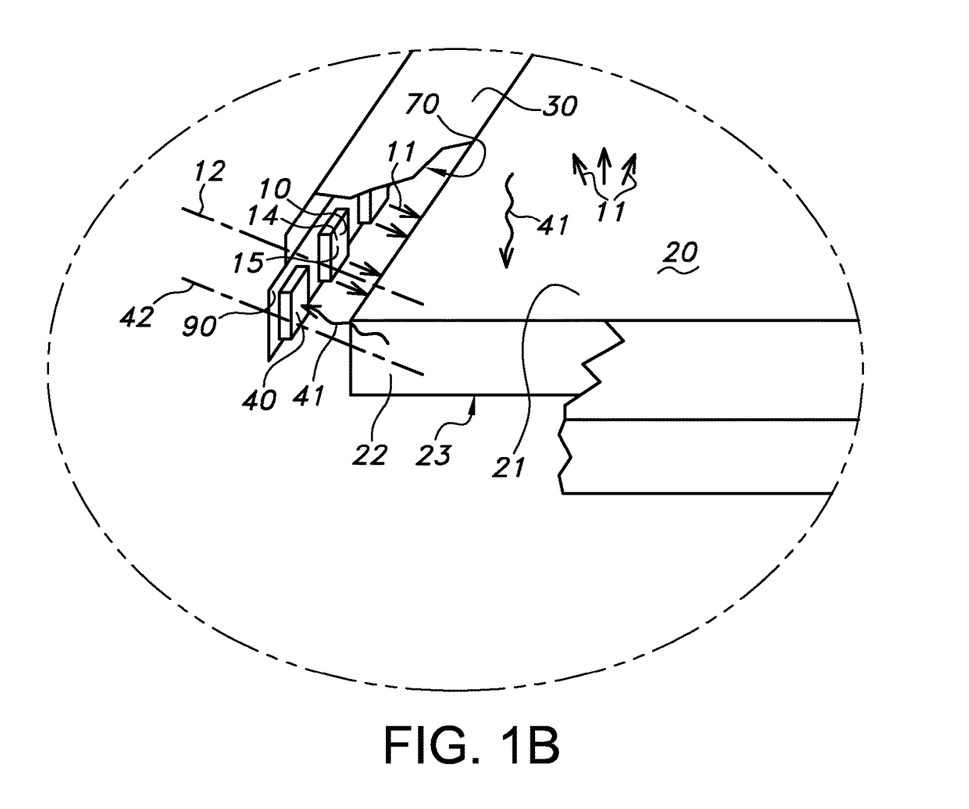

In FIG. 1a and FIG. 1b schematically an embodiment of the lighting device 100 is depicted. The lighting device comprises a light guide plate 20 and a rim 30 surrounding the circumferential edge 22 of the light guide plate 20. The light guide plate 20 comprises a first face 21 and a second face 23. The lighting device 100, especially the light guide plate 20 of the invention may comprise any arbitrarily shape. In the given embodiment the light guide plate 20 comprises a rectangular shape, especially a square shape.

FIG. 1b shows a part of the embodiment of FIG. 1a in more detail. In the figure a part (two) of the plurality of light sources 10 is visible as well as an IR sensor 40. The figure further shows that the rim 30 comprises the light sources 10 and the IR sensor 40. The light sources 10 are configured to provide light source light 11. The light guide plate 20 comprises a circumferential edge 22. In the figure the light sources 10 provide light source light 11 in a direction towards the circumferential edge 22 of the light guide plate 20. Herein this configuration is especially referred to as the light sources 10 are configured in an edge-lighting configuration with the light guide plate 20, or as a side-lit configuration or an edge-lit configuration.

At least part of the circumferential edge 22 receives the light 11 and allows the light 11 to enter the light guide plate 20. Hence, at least part of the circumferential edge 22 is configured as light incoupling face for the light source light 11. In the plate 20 the light source light 11 may bounce and reflect, but especially is guided to the first face 21. The light source light 11 is emitted from the first face 21 as is indicated by the arrows 11. Herein, this is also indicated by the term "at least a part of the first face 21 is configured as light outcoupling face".

In the figure, the light sources 10 comprise solid state light sources 14, especially light emitting diodes (LED's) 15. The light sources 10, or at least a subset of the plurality of light sources 10, may be connected to a printed circuit board (PCB) 90 as is shown in the figure. Also the IR sensor 40 is connected to the same printed circuit board 90. The IR sensor 40 (or sensors 40) may also be connected to another PCB (not shown)

It is further noted that the depicted embodiment further comprises a control unit 70 that is configured to control the light source light 11. The control unit 70 is hidden under the rim 30 and is functionally coupled to the IR sensor 40 and the plurality of light sources 10. In the depicted embodiment, the control unit 70 is coupled via the PCB 90 with the light sources 10 and the IR sensor 40.

In FIG. 1b only a small part of the circumferential edge is shown, showing light source 10 at that part. Yet, in embodiments a first subset of the plurality of light sources 10 is arranged at a first part of the circumferential edge 22, and especially a second subset of the plurality of light sources 10 is arranged at another part of the circumferential edge 22. Especially, these parts may comprise opposite parts of the circumferential edge 22 of the light guide plate 20.

Based on the configuration of the lighting device 100, light source light 11 may especially travel from the light sources 10, via the light incoupling face of the circumferential edge 22, into the light guide plat 20 and next via the light outcoupling face of the first face 21 away from the lighting device 100. The IR sensor 40 is especially configured to sense IR radiation 41 via the light guide plate 20. Analogously to a path of light 11, IR radiation 41 may travel from a location upstream of the lighting device 100 via the first face 21 of the light guide plate into the light guide plate 20 and next via the circumferential edge 22 to the IR sensor 40. Hence especially an axis 12 of the light source light 11 may be arranged parallel to an axis 42 of radiation of the IR radiation 41.

Especially (also) at least part of the first face 21 is configured as incoupling face for IR radiation 41, and at least part of the circumferential edge 22 is configured as radiation outcoupling face for the IR radiation 41.

Figure 2:
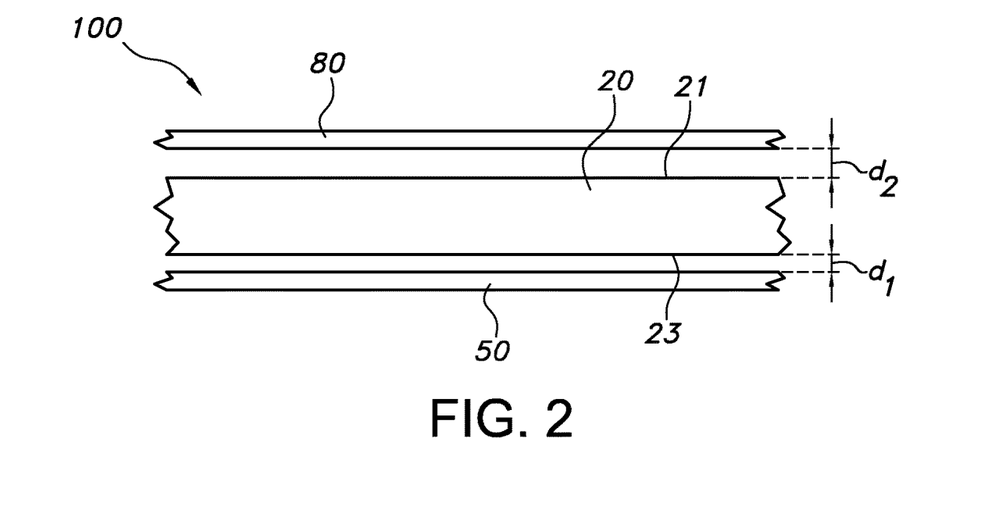
FIG. 2 schematically depicts some further aspects of the lighting device.

The lighting device 100 may further comprising a reflector 50 configured to reflect light 11 that escapes from the light guide plate 20 via the second face 23 back into the light guide plate 20. This is schematically depicted in FIG. 2. In embodiments the reflector 50 is arranged at a distance d1 downstream from the second face. In further embodiments, this distance d1 is almost substantially 0 mm. This distance d1 is especially larger than a wavelength of the emission or radiation of relevance, such as the wavelength of the light emitted and/or the IR radiation, such as equal to or larger than 1 μm, such as equal to or larger than 0.1 mm. Hence the distance d1 is especially a non-zero distance.

The embodiment of FIG. 2 further comprises a light transmissive optical element 80 arranged over at least part of the first face 21. Such element 80 may be arranged at a distance d2 downstream from the first face 21. For instance baffles or louvres may be arranged at a distance d2. The light transmissive optical element 80 may also comprise a color filter or a micro lens optics plate. Yet, in embodiments, the light transmissive optical element 80 comprises a diffusor that is arranged at a distance d2 of almost substantially zero. Also d2 is especially a non-zero distance and especially larger than a wavelength of the visible light emitted, such as equal to or larger than 0.7 μm.

Figure 3:
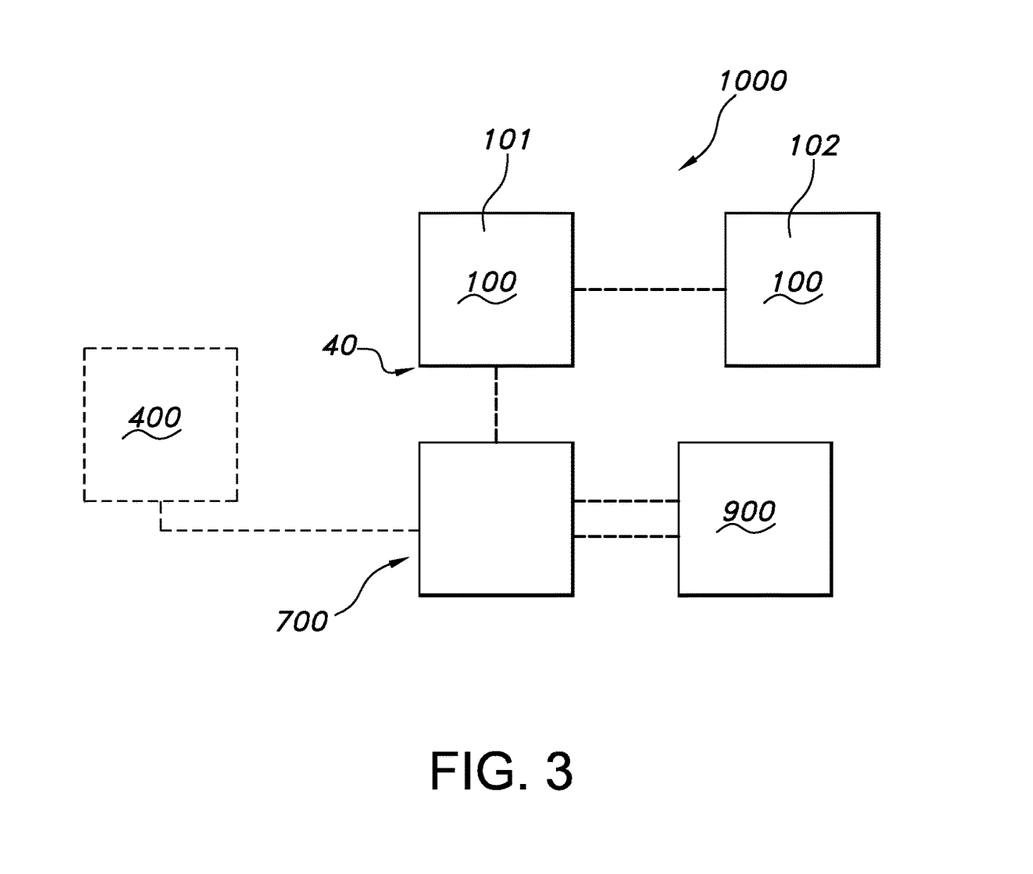
FIG. 3 schematically depicts some aspects of the lighting system.

FIG. 3 schematically depicts aspects of an embodiment of the lighting system 1000 described herein, comprising the lighting device 100 of the invention. The system 1000 of the invention further comprises a control system 700 especially configured to functionally coupling with a user interface device 900.

The lighting system 1000 may especially comprise a plurality of lighting devices 100. The depicted embodiment comprises e.g. two lighting devices 100; a first lighting device 101 and a second lighting device 102. The embodiment also comprises the user interface device 900. The user interface 900 may e.g. comprise a portable user interface device 900, such as a remote control. The lighting system 1000 may comprise an IR transmitter 400. In the depicted embodiment, the lighting system 1000 comprises an IR transmitter 400, configured to transmit an IR signal to be sensed by the IR sensor 40 of the lighting device 100, 101.

The IR transmitter 400 may be configured in the user interface device 900. The IR transmitter 400 may also be configured in a lighting device 100. The transmitter 400 may also comprise a standalone transmitter 400, such as a remote control. In the figure this is schematically depicted by the dotted line indicating the IR transmitter 400. Especially the different dotted lines connecting the different elements may indicate some functional connections or relationships between elements. The user interface device 900 may as part of the control system 700 e.g. be functionally coupled to the first lighting device 101 (especially via the IR sensor 40 of the first lighting device 101), and may e.g. control a condition of the first lighting device 101. The user interface device 900 may further control a condition of the second lighting device 102 via the first lighting device 101, as is indicated by the dotted line between the two lighting devices 100. Yet in further embodiments the first lighting device 101 may directly control the second lighting device 102, or the control system 700 may directly control a condition of the first lighting device 101 and of the second lighting device 102. Herein this is also indicated by the terms "master (device)" and "slave (device)". Especially, a master device may control one or more slave devices. A device such as a lighting device 100 may comprise a master device function as well as a slave device function. The lighting system 1000 may be further extended with a further lighting device 100. Herein this is referred to as commissioning, wherein a lighting system 1000 is assigned to a lighting system 1000. In the case of commissioning a lighting device 100, a remote transmitter 400 may e.g. send an IR signal to the lighting device 100, and the lighting device 100 may subsequently announce or register itself at the lighting system 1000, e.g. by sending a signal to a further sensor (not shown) of the lighting system 1000 (especially functionally coupled to the control system 700 or comprises by the control system 700).

The term "plurality" refers to two or more.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising a plurality of light sources, a light guide plate, a rim, and an IR sensor, wherein:
    the light sources are configured to provide light source light, and wherein the light sources are configured in an edge-lighting configuration with the light guide plate;
    the light guide plate comprises (i) a circumferential edge of which at least part is configured as light incoupling face for the light source light, and (ii) a first face of which at least part is configured as light outcoupling face;
    a reflector, wherein the reflector is configured to reflect back into the light guide plate light that escapes from the light guide plate via a second face of the light guide plate opposite the first face, said reflector being arranged at a distance (d1) from the second face;
    the rim comprises the plurality of light sources and the IR sensor;
    at least part of the circumferential edge is configured as an irradiation outcoupling face; and,
    the IR sensor is configured to sense IR radiation via the light guide plate.

2. The lighting device according to claim 1, wherein the IR radiation comprises near-infrared radiation.

3. The lighting device according to claim 1, wherein the light sources comprise solid state light sources.

4. The lighting device according to claim 1, wherein the light sources comprise light emitting diodes (LED's).

5. The lighting device according to claim 1, further comprising the plurality of light sources and a control unit functionally coupled to the IR sensor for receiving an IR signal and,
    wherein the control unit is configured to control the light source light based at least in part on said IR signal.

6. The lighting device according to claim 1, wherein said distance (d1) is in the range of 0.7 µm to 10 mm, preferably in a range of 1.0 µm to 1 mm.

7. The lighting device according to claim 1, wherein said distance (d1) from a gap, said gap being filled with air or MgF2.

8. The lighting device according to claim 1, further comprising a light transmissive optical element arranged over at least part of the first face, wherein the light transmissive optical element comprises one or more of a diffusor, a color filter, or a micro lens optics plate.

9. The lighting device according to claim 1, wherein the light guide plate comprises a rectangular shape.

10. The lighting device according to claim 1, wherein a first subset of the plurality of light sources and a second subset of the plurality of light sources are arranged at opposite parts of the circumferential edge of the light guide plate.

11. The lighting device according to claim 1, wherein at least a subset of the plurality of light sources is connected to a printed circuit board and the IR sensor is connected to the same printed circuit board.

12. A lighting system comprising a lighting device according to claim 1 and a control system.

13. The lighting system according to claim 12, further comprising a user interface device functionally coupled to the control system.

14. The lighting system according to claim 12, wherein the lighting system comprises an IR transmitter configured to transmit an IR signal to be sensed by the IR sensor of the lighting device.

15. The lighting system according to claim 12, comprising a plurality of lighting devices.

* * * * *